(12) United States Patent
Gerlach

(10) Patent No.: US 12,717,167 B2
(45) Date of Patent: Aug. 25, 2026

(54) OPHTHALMIC LENS AND METHOD FOR DESIGNING AN OPHTHALMIC LENS

(71) Applicant: Carl Zeiss Meditec AG, Jena (DE)

(72) Inventor: Mario Gerlach, Glienicke-Nordbahn (DE)

(73) Assignee: Carl Zeiss Meditec AG, Jena (DE)

( * ) Notice: Subject to any disclaimer, the term of this patent is extended or adjusted under 35 U.S.C. 154(b) by 425 days.

(21) Appl. No.: 18/255,549

(22) PCT Filed: Dec. 3, 2021

(86) PCT No.: PCT/EP2021/084216
§ 371 (c)(1),
(2) Date: Jun. 1, 2023

(87) PCT Pub. No.: WO2022/117841
PCT Pub. Date: Jun. 9, 2022

(65) Prior Publication Data
US 2024/0094558 A1 Mar. 21, 2024

(30) Foreign Application Priority Data
Dec. 4, 2020 (DE) ..................... 10 2020 215 362.0

(51) Int. Cl.
*G02C 7/04* (2006.01)

(52) U.S. Cl.
CPC ......... *G02C 7/042* (2013.01); *G02C 2202/20* (2013.01)

(58) Field of Classification Search
CPC ........... A61F 2/16; A61F 2/1654; G02C 7/04; G02C 7/42; G02C 2202/20; G02B 3/06; G02B 3/02; G02B 3/10; G02B 27/42
(Continued)

(56) References Cited

U.S. PATENT DOCUMENTS 5,699,142 A * 12/1997 Lee ...................... G02B 5/1895 359/571
2006/0116764 A1* 6/2006 Simpson ............... A61F 2/1654 623/6.3

(Continued)

FOREIGN PATENT DOCUMENTS

EP 2375276 A1 10/2011
IL 105434 A 3/1998

(Continued)

OTHER PUBLICATIONS

International Preliminary Report on Patentability issued in PCT/EP2021/084216, to which this application claims priority, mailed May 30, 2023, and English-language translation thereof.

(Continued)

*Primary Examiner* — Travis S Fissel
(74) *Attorney, Agent, or Firm* — Pearl Cohen Patentanwälte PartGmbB; Michael McCandlish

(57) ABSTRACT

An ophthalmic lens includes a lens body with a predetermined refractive effect and a ring-shaped, diffractive structuring. The ring-shaped, diffractive structuring (4-4) has a waveform in the radial direction which differs from a sinusoidal waveform by an asymmetry and/or a flattening and/or a periodicity, wherein the asymmetry and/or flattening and/or periodicity is constant or changes strictly monotonically over the entire radial curve of the waveform. Further, a method for designing an ophthalmic lens is disclosed.

18 Claims, 13 Drawing Sheets

(58) Field of Classification Search
USPC ..................................................... 351/159.44
See application file for complete search history.

(56) References Cited

U.S. PATENT DOCUMENTS

2008/0269882 A1* 10/2008 Simpson ............... A61F 2/1613 623/6.17
2009/0195748 A1* 8/2009 Bandhauer ............. G02C 7/044 623/6.3
2010/0097569 A1* 4/2010 Weeber .................... G02C 7/06 623/6.3
2011/0292335 A1* 12/2011 Schwiegerling ....... G02C 7/028 623/6.11
2012/0224138 A1* 9/2012 Cohen ................... A61F 2/1618 623/6.28
2020/0121448 A1 4/2020 Choi et al.

FOREIGN PATENT DOCUMENTS

WO 2019020435 A1 1/2019
WO 2020053864 A1 3/2020

OTHER PUBLICATIONS

Moreno et al., "High efficiency diffractive lenses: Deduction of kinoform profile," American Journal of Physics, vol. 65, No. 6, pp. 556 to 562, Jun. 1997.
Osipov et al., "Application of nanoimprinting technique for fabrication of trifocal diffractive lens with sine-like radial profile," Journal of Biomedical Optics, SPIE, vol. 20, No. 2, pp. 25008-1 to 25008-7, Feb. 2015.
Search Report by the German Patent and Trademark Office issued in DE 10 2020 215 362.0, to which this application claims priority, mailed May 20, 2021. Opinion issued in PCT/EP2021/084216, to which this application claims.
International Search Report and Written Opinion issued in PCT/EP2021/084216, to which this application claims priority, mailed May 13, 2022.
Office Action by the European Patent Office (EPO) issued in EP 21 830 972.2, which is a counterpart hereof, mailed on Sep. 12, 2025, and English-language machine translation thereof.

* cited by examiner

Z1
Z2
Z3
Z4
Z5
[μm]
1
2
3
4
r²
[mm^2]
-0.5
-1.0
-1.5
-2.0

1002
[mm/mm]
1004
1006
1008
0.01
-0.01
-0.02
-0.03

[mm/mm]
0.030
0.025
0.020
0.015
0.010
0.005
0.03
0.0215
0.0087
0.007

Z1
Z2
Z3
Z4
Z5
[μm]
1
2
3
4
r²
[mm^2]
-0.2
-0.4
-0.6
-0.8
-1.0
-1.2

1002
[mm/mm]
1004
1006
1008
0.005
-0.005
-0.010
-0.015

[mm/mm]
0.017
0.015
0.012
0.010
0.0048
0.005
0.004

OPHTHALMIC LENS AND METHOD FOR DESIGNING AN OPHTHALMIC LENS

CROSS REFERENCE TO RELATED APPLICATIONS

This application is a national stage of international patent application PCT/EP2021/084216, filed on Dec. 3, 2021 and designating the U.S., which claims priority to German patent application DE 10 2020 215 362.0, filed on Dec. 4, 2020, which is hereby incorporated by reference in its entirety.

TECHNICAL FIELD

The present disclosure relates to an ophthalmic lens and to a method for designing an ophthalmic lens. Consequently, the disclosure is in particular in the field of ophthalmic lenses, more particularly in the field of contact lenses and intraocular lenses.

BACKGROUND

Ophthalmic lenses typically have a lens body which, due to its nature, produces a refractive effect. The practice of furnishing ophthalmic lenses with diffractive structures in order to additionally equip these ophthalmic lenses with a diffractive effect is also known from the related art. For example, the use of diffractive structures with a sinusoidal profile curve to produce multifocal ophthalmic lenses or lenses with an extended depth of focus, so-called Enhanced Depth of Focus lenses (abbreviated as: EDoF lenses), is known in the related art and used in commercial products. For example, sinusoidal diffraction profiles are used in trifocal contact lenses by the Israeli company Holo Or. In addition, sinusoidal diffraction profiles are used by VSY Biotechnology to create the ACRIVA TRINOVA trifocal presbyopia-correcting lens. Sinusoidal diffractive structures have the property that they cause a mirror symmetric intensity distribution in the region around the zeroth order of diffraction, provided polychromatic effects and the material dispersion of the lens body remain unconsidered.

Additionally, WO 2020/053864 A1 has disclosed ophthalmic lenses which have a curve deviating from a sinusoidal shape in individual periods of the diffractive structure.

SUMMARY

It is an object of the present disclosure to improve the optical properties of ophthalmic lenses even further.

According to the disclosure, this object is achieved by ophthalmic lenses and methods having the features of the respective independent claims. Exemplary embodiments are specified in the dependent claims and in the description.

An exemplary embodiment of the disclosure relates to an ophthalmic lens comprising a lens body with a predetermined refractive effect and a ring-shaped, diffractive structuring. Here, the ring-shaped, diffractive structuring in the radial direction has a waveform which differs from a sinusoidal waveform of the square of the radius by an asymmetry and/or a flattening and/or the periodicity. Further, the asymmetry and/or flattening and/or periodicity is constant or changes strictly monotonically over the entire radial curve of the waveform.

A further exemplary embodiment of the disclosure relates to a method for designing an ophthalmic lens comprising a lens body with a predetermined refractive effect and a ring-shaped, diffractive structuring. In this case, designing is implemented in such a way that the ring-shaped, diffractive structuring has a waveform in the radial direction which differs from a sinusoidal waveform of the square of the radius by an asymmetry and/or a flattening and/or the periodicity, and that the asymmetry and/or flattening and/or periodicity is constant or changes strictly monotonically over the entire radial curve of the waveform.

In this case, an ophthalmic lens is in particular a lens provided for the correction of a refractive error in a human being or animal. In particular, the ophthalmic lens can be designed as a contact lens or an intraocular lens (IOL). Hereinafter, the terms "lens" and "ophthalmic" lens are used as synonyms.

In this context, the lens body is the part of the lens that provides a refractive effect on account of its shape and material properties. In the process, the lens body can have a predetermined refractive index and/or a predetermined thickness and/or predetermined radii of curvature on its surface. Here, the predetermined refractive effect is the refractive effect that is defined by the choice of the aforementioned parameters for the lens. In particular, the predetermined refractive effect can be fixed for a lens, which is to say that the eye has no possibility of changing the refractive effect of the lens. This is particularly the case with contact lenses. IOLs can also have a fixed focal length with a predetermined, unchanging refractive effect.

A sinusoidal waveform of the square of the radius is such a waveform that has a sinusoidal shape when plotted as the amplitude curve of the waveform against the square of the radius, which is to say against the radius squared or $r^2$. In other words, such a waveform does not exhibit a sinusoidal shape when plotted against the (linear) radius, but only when the amplitude curve is considered against the radius squared. A waveform deviating from a sinusoidal waveform of the square of the radius in terms of an asymmetry and/or a flattening and/or the periodicity accordingly does not represent a sinusoidal waveform of the square of the radius. In the context of the disclosure, the term "radial curve" is to be understood merely as an indication of direction, unless explicitly stated otherwise. A radial curve of a waveform can therefore also inherently have a periodicity with $r^2$, unless explicitly stated otherwise.

Here, the ring-shaped, diffractive structuring is a structure which is arranged in and/or on the lens body and brings about a diffractive effect. For example, the diffractive structuring can be applied onto and/or into the lens by milling, engraving, laser engraving, a turning method, a molding technique (for example by polymerization in a master mold) and/or another form of processing. In this context, the diffractive structuring optionally has a different local transparency and/or a different local refractive index than the surrounding medium of the lens body. On account of the topographical modulation of the surface of the lens body, the diffractive structuring brings about optical path length differences or phase differences of light beams which pass through the diffractive structure at different radial positions. In this context, the fact that the diffractive structuring is ring-shaped means that the diffractive structuring extends in the form of one or more closed rings on and/or in the lens body. The ring-shaped, diffractive structure need not necessarily extend over the entire lens body or over an entire surface of the lens body, although this is possible according to exemplary embodiments. According to other exemplary embodiments, the diffractive structuring only extends over a partial region of the lens body.

The fact that the waveform has an asymmetry means that periods of the waveform and/or individual periods of the waveform of the square of the radius cannot be mapped onto one another by a reflection, for example at a local maximum of the waveform. The asymmetry can be formed in particular by edges with different gradients running toward or away from a local maximum. In the context of this disclosure, the asymmetry has to be present with respect to the radius squared, with the result that the asymmetry is asymmetrical with respect to a sinusoidal waveform of the square of the radius.

In this context, the flattening of the waveform should be understood to be a curve shape of the waveform deviating from a sinusoidal shape of the square of the radius, which can be distinguished in particular by steeper edges and a flatter area around the local maxima. In an extreme form, the flattening can result in the waveform having an almost square curve distinguished by very steep edges and a flat area extending over almost half a period length. In particular, the flattening may come about through the decisive involvement of higher harmonics of an underlying baseline sinusoidal curve.

The periodicity characterizes the regularity of the waveform. However, there need not be a strict periodicity in the mathematical sense. Rather, the periodicity can also change over the radial curve of the waveform, for example by the period length becoming shorter or longer. The periodicity also need not to be given with respect to the (linear) radius of the lens body, but can also be present with respect to a higher or lower power of the radius, for example. By way of example, the waveform can be periodic in the square of the radius, which is to say plotting the waveform against the radius squared results in a periodic curve, but a plot against the (linear) radius shows a decreasing period length. The power of the radius with which the periodicity is present need not necessarily be an integer.

The fact that the asymmetry and/or the flattening and/or the periodicity changes strictly monotonically over the entire radial curve of the waveform means that the asymmetry and/or the flattening and/or the periodicity increases or decreases continuously over the radial curve, more precisely with $r^2$ over the curve. In particular, this precludes the asymmetry and/or the flattening and/or the periodicity from having a discontinuous change in the radial direction. In other words, the strictly monotonic change in the asymmetry and/or the flattening is expressed as a strictly monotonic increase or a strictly monotonic decrease in the asymmetry and/or the flattening. Accordingly, the strictly monotonic change in periodicity is expressed as a waveform period length which increases or decreases in the radial direction. In addition to one or more of the aforementioned parameters, which change strictly monotonically over the entire radial curve of the waveform, the amplitude of the waveform can optionally also change strictly monotonically over the entire radial curve of the waveform.

Exemplary embodiments according to the disclosure offer the advantage of providing degrees of freedom which allow the intensity distribution of the diffracted light to be adapted to the different orders of diffraction. In particular, the disclosure offers the advantage that the diffraction intensity in the negative orders of diffraction can be increased, and at least partial matching of the polychromatic diffraction efficiency of the negative orders of diffraction to the polychromatic diffraction efficiency of the positive orders of diffraction can be achieved in this way. The polychromatic diffraction efficiency is understood to be the polychromatically summed or integrated diffraction efficiency in this context. While the diffractive dispersion, which is to say the dependence of the optical path length on the wavelength of the incident light, is in the opposite sense to the material dispersion of the lens body, which is to say the material-related wavelength dependence of the refractive index of the lens body, and at least partially compensates the latter in the case of positive orders of diffraction, the diffractive dispersion and the material dispersion are in the same sense for the negative orders of diffraction and thus amplify. According to the disclosure, this can be counteracted by increasing the diffraction efficiency for the negative orders of diffraction, or at least for the first negative order of diffraction, in order to still achieve a polychromatic diffraction efficiency for the first negative order of diffraction and/or other negative orders of diffraction which is comparable to, or even better than, the polychromatic diffraction efficiency of the zeroth or first positive order of diffraction, despite the superposition of the diffractive dispersion and the material dispersion.

Accordingly, the disclosure offers the advantage that it is possible to provide multifocal lenses, for instance trifocal lenses, in which the diffraction efficiency of the negative orders of diffraction, and in particular of the first negative order of diffraction, is comparable to, or better than, the diffraction efficiency of the zeroth or first positive order of diffraction. This makes it possible to provide an ophthalmic lens, in particular an IOL or a contact lens, which has improved imaging performance in the distance range, for which the first negative order of diffraction is typically used. As a result, the comfort of wear can be increased, since the latter is typically influenced the most by the imaging performance for distance vision.

In addition, the disclosure offers the advantage that the provided degrees of freedom can also be used to improve monofocal ophthalmic lenses in the sense of being able to increase the depth of focus. As a result, the range in which the user of the ophthalmic lens can see clearly with the lens can be increased, and hence the patient's satisfaction with the lens can be improved. This is made possible by the fact that the polychromatic diffraction efficiency can be adapted in such a way by the degrees of freedom that, for example, an overlapping polychromatic diffraction intensity of the zeroth, first positive, and first negative orders of diffraction can be used to achieve an effect which offers an increased depth of focus in comparison with conventional monofocal lenses.

Optionally, the entire waveform of the ring-shaped, diffractive structuring has a continuously differentiable curve in the radial direction. In other words, the ring-shaped, diffractive structuring has no steps or jumps in the radial direction. This offers the advantage that the manufacturability of the lens can be improved. In addition, the homogeneity of the diffractive and refractive effect can be improved thereby.

The ring-shaped, diffractive structuring is optionally arranged on a surface of the lens body. For example, the ring-shaped, diffractive structuring can be applied to and/or machined into a surface, for example by engraving and/or appropriate shaping during casting and/or injection molding of the lens body. Alternatively or in addition, a ring-shaped, diffractive structuring can be provided in the interior of the lens body. For example, this can be achieved by local changes in the transparency and/or the refractive index in the interior of the lens body as a result of irradiation with a laser. The type of attachment that appears most suitable, depending on the type of production, can be used.

Optionally, the refractive effect of the lens body is at least partially spherical, aspheric, or toric. This offers the advantage that the refractive effect of the lens body can be adjusted for the desired use of the zeroth order of diffraction and can be tailored to the needs of the user.

The ring-shaped, diffractive structuring is optionally formed concentrically around an optical axis of the ophthalmic lens. This offers the advantage that the desired imaging performance is along the optical axis and possible imaging aberrations can be reduced or even avoided entirely.

Optionally, the asymmetry is such that the average and/or maximum absolute value of the gradient of a rising edge differs from the average or maximum absolute value of the gradient of a falling edge in the respective periods of the waveform. In other words, the two edges of the periods of the waveform are formed differently. This offers a degree of freedom which provides an efficient option for adapting the optimization of the polychromatic diffraction efficiency of the individual orders of diffraction.

According to some exemplary embodiments, the asymmetry is such that the maximum absolute value of the gradient of the falling edge is greater than the maximum absolute value of the gradient of the rising edge in the respective periods of the waveform. This offers the advantage of being able to provide multifocal lenses, in particular, in which the polychromatic diffraction intensity of the first negative order of diffraction is equal to, or even greater than, the polychromatic diffraction intensity of the zeroth or first positive order of diffraction. Accordingly, this is particularly suitable for providing lenses that enable a particularly good imaging performance for distance vision. Optionally, the ratio of the maximum absolute value of the gradient of the falling edge to the maximum absolute value of the gradient of the rising edge is at least 1.5 in this case. In other words, the falling edge is at least 1.5 times steeper than the rising edge. This offers the option of shifting the distribution of the polychromatic diffraction intensity to the first negative order of diffraction in particularly pronounced fashion. The ophthalmic lens is optionally designed to be multifocal, in particular trifocal. In the case of lenses of this type, the benefit of a high polychromatic diffraction intensity is particularly great for the first negative order of diffraction, since this is typically used for distance vision, which is of particularly great importance for the comfort of wear of the lens. Optionally, the ring-shaped, diffractive structuring is accordingly formed such that at least one negative order of diffraction of the ring-shaped, diffractive structuring has a greater polychromatic diffraction efficiency than the zeroth order of diffraction and/or the first positive order of diffraction.

According to other exemplary embodiments, the asymmetry is such that the maximum absolute value of the gradient of the rising edge is greater than the maximum absolute value of the gradient of the falling edge in the respective periods. This is advantageous for monofocal lenses with an extended depth of focus, so-called enhanced depth of focus lenses, in particular, as this enables the provision of a wide polychromatic diffraction intensity which extends over the first negative and zeroth orders of diffraction and optionally over the first positive order of diffraction as well, and thus enables a large depth of focus. Optionally, the ratio of the maximum amount of the slope of the rising edge to the maximum amount of the slope of the falling edge is at least 1.5. This enables a particularly pronounced generation of a large depth of focus. Optionally, the ring-shaped, diffractive structuring is formed in this case such that the polychromatic diffraction efficiency of at least one negative order of diffraction of the ring-shaped, diffractive structuring is at least 75% of the diffraction efficiency of the zeroth order of diffraction and/or the first positive order of diffraction. This favors the overlap of the polychromatic diffraction intensities of the first negative and zeroth orders of diffraction and optionally of the first positive order of diffraction, and thus the provision of a large depth of focus.

The features and exemplary embodiments specified above and explained below should not only be considered to be disclosed as in the respective explicitly mentioned combinations in this case, but are also comprised by the disclosure in other technically advantageous combinations and exemplary embodiments.

BRIEF DESCRIPTION OF THE DRAWINGS

Further details and advantages of the disclosure should now be explained in more detail on the basis of the following examples and exemplary embodiments with reference being made to the figures, in which.

DESCRIPTION OF EXEMPLARY EMBODIMENTS

The same or similar elements in the various exemplary embodiments are denoted by the same reference signs in the following figures for reasons of simplicity.

Different ophthalmic lenses according to exemplary embodiments of the disclosure are explained with reference to the following figures.

Figures 1A, 1B:
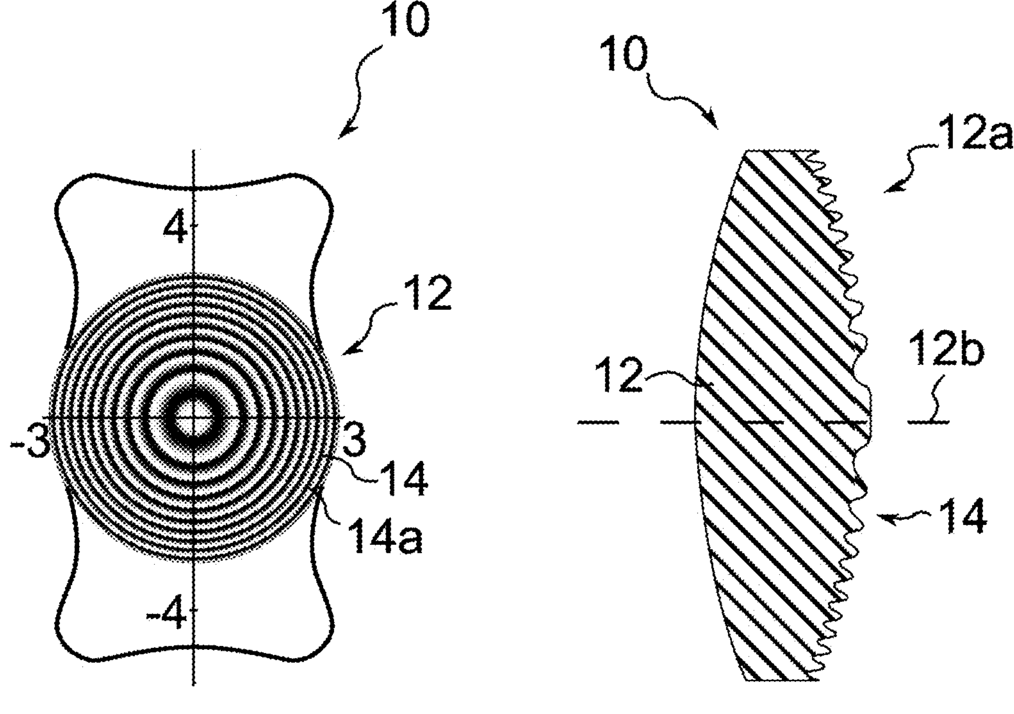
FIGS. 1A and 1B show schematic illustrations of a plan view and a cross-sectional view of an ophthalmic lens.

FIGS. 1A and 1B show schematic illustrations of a plan view (FIG. 1A) and a cross-sectional view (FIG. 1B) of an ophthalmic lens 10. In this case, the ophthalmic lens 10 is designed as a multifocal intraocular lens (IOL).

The lens 10 comprises a lens body 12 which has a refractive effect on account of its material properties, in particular its refractive index, and its shape. On the front side 12*a* of the lens body 12, the lens 10 has a diffractive structuring 14, as a result of which the lens 10 also has a diffractive effect in addition to the refractive effect. According to the exemplary embodiment shown, the diffractive structuring is wave-shaped, with the structuring having a wave-shaped depth profile in the radial direction. It should be noted that these are only schematic illustrations in which the waveform of the diffractive structuring is shown in greatly exaggerated fashion for better identification. In actual configurations, both the amplitude and the period of the waveform can have a significantly smaller and more delicate design in comparison with the dimensions of the lens body 12.

As is evident from FIGS. 1A and 1B, the diffractive structuring 14 is ring-shaped, with the rings 14*a* of the diffractive structuring 14 running concentrically around the optical axis 12*b* of the lens 10. The waveform deviates from a sinusoidal waveform of the square of the radius in that the waveform is periodic in the radial direction of the lens body with respect to the linear radius of the lens body 12 and the individual periods, which is to say the sections from one local maximum to the next local maximum, are asymmetric.

Figure 2A:
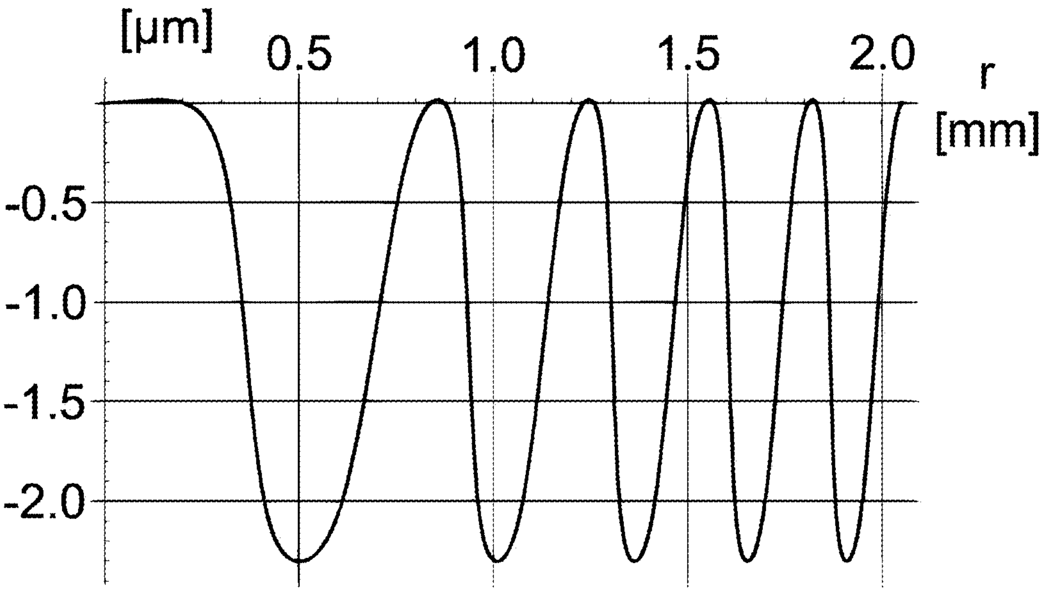
FIGS. 2A and 2B show the wave-shaped height profile of the diffractive structuring of the lens from FIGS. 1A and 1B.
Figure 2B:
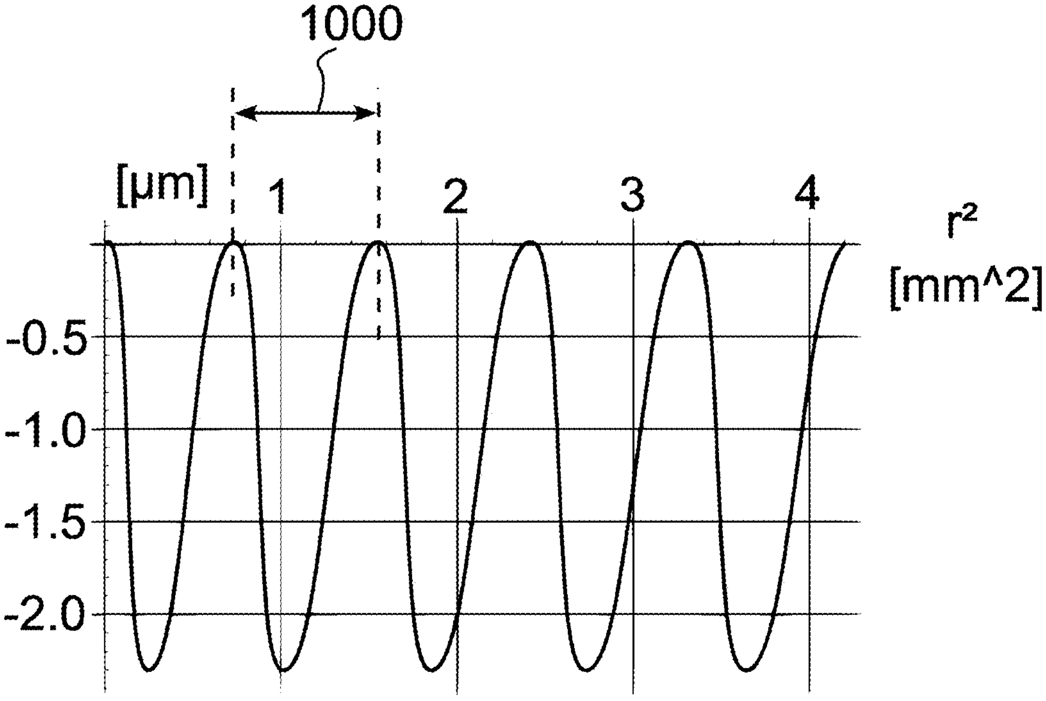

The graphs in FIGS. 2A and 2B show the wave-shaped height profile of the diffractive structuring 14 of the lens 10 from FIGS. 1A and 1B. In this case, the height profile relative to the otherwise smooth surface of the front side 12*a* of the lens body 12 is given on the vertical axis in micrometers. The height profile of the unstructured front side 12*a* or surface of the lens body 12 represents a base line, which was subtracted from the overall curve of the height contour in order to create the graphs shown, with the result that the wave-shaped curve of the diffractive structuring 14 in the radial direction can be seen unaffected by the curvature of the front side 12*a* of the lens body 12.

In FIG. 2A, the curve of the diffractive structuring is plotted as a function of the (linear) radius r, which is to say that the linear radius r is plotted on the horizontal axis in millimeters, starting from the optical axis 12*b* of the lens 10. By contrast, FIG. 2B shows the wave-shaped curve as a function of the square of the radius r, which is to say that the square of the radius $r^2$ is plotted along the horizontal axis in $mm^2$.

What is evident here is that the diffractive structuring 14 of the lens body 12 according to the exemplary embodiment shown runs periodically with the square of the radius along the radial direction. That is to say the curve has a periodicity in a plot against $r^2$, with the result that the local maxima are spaced equidistantly. A period is plotted in exemplary fashion in FIG. 2B and provided with the reference sign 1000. By contrast, if the wave-shaped curve is considered linearly, which is to say in a plot against the linear radius r, as provided in FIG. 2A, the local maxima are not arranged equidistantly, but are compressed with increasing radius. Nevertheless, the individual sections of the curve from one maximum to the next maximum are referred to as a “period” for the sake of simplicity. The periodicity of the wave-shaped curve of the diffractive structuring 14 with the square of the radius offers the advantage that a greater diffractive effect can be achieved in the radially outer areas than in the radially inner areas, and this allows focusing of the incident and diffracted light to be achieved. The periodicity with the square of the radius leads to approximately the same surface areas being formed between the individual rings 14*a* of the ring-shaped, diffractive structuring 14.

FIGS. 2A and 2B further illustrate that the waveform has asymmetry and deviates from a sinusoidal waveform in this way. In this case, the falling edge, which is to say the edges that lead away from a local maximum, is steeper than the rising edges that lead to a local maximum. This allows the diffraction intensity of the individual orders of diffraction to be changed, and in particular allows the diffraction intensity of the first negative order of diffraction to be increased and the diffraction intensity of the first positive order of diffraction to be reduced.

The wave-shaped profile of the diffractive structuring 14 can be used, for example, for a lens body 12 with a refractive index of $n_{IOL}$=1.46.

Figures 3A, 3B, 3C:
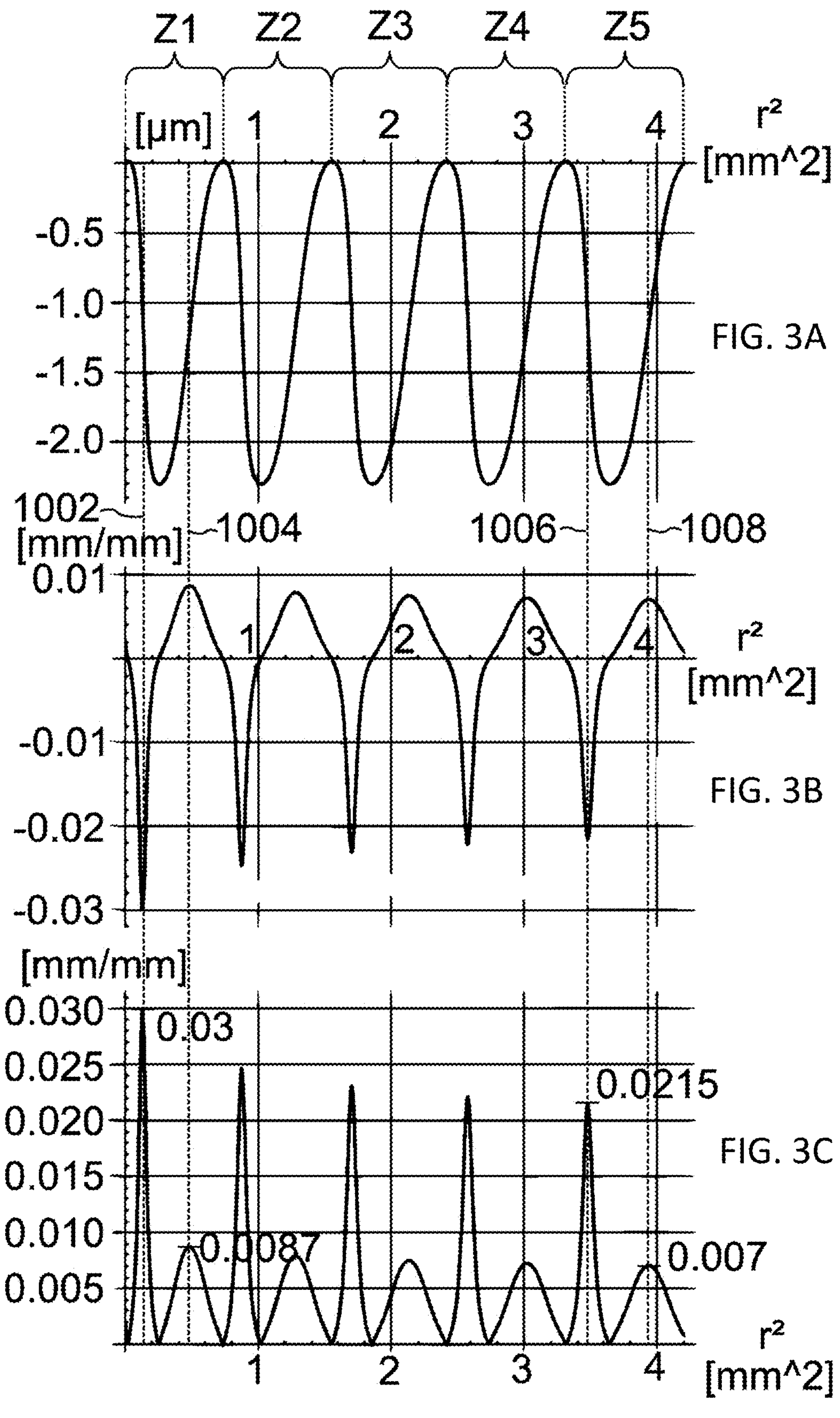
FIGS. 3A to 3C show further illustrations of the wave-shaped curve of the diffractive structuring.

FIGS. 3A to 3C show a more detailed representation of the wave-shaped curve of the diffractive structuring 14 plotted against the radius squared $r^2$.

In this case, FIG. 3A corresponds to the curve of the wave-shaped profile, as in FIG. 2B; FIG. 3B corresponds to the first derivative (in units of mm/mm) with respect to the radius; and FIG. 3C corresponds to the absolute value of the first derivative (correspondingly also in units of mm/mm). The individual periods are identified as Z1 to Z5. As a precaution, reference is made to the fact that only a part of the wave-shaped curve, is shown and the actual waveform may have significantly more than five periods.

The vertical dashed lines 1002 and 1004, which extend across all three graphs, mark those locations at which the falling edge (line 1002) and the rising edge (line 1004) have their respective maximum absolute value of the gradient in the period Z1. Here, it is evident from the graph in FIG. 3C in particular that, according to the exemplary embodiment shown, the absolute value of the gradient of the falling edge is significantly greater than the absolute value of the gradient of the rising edge. For further clarification, the numerical values are given, with the absolute value of the gradient of the falling edges being 0.03 mm/mm and the absolute value of the gradient of the rising edge being 0.0087 mm/mm. The absolute value of the gradient of the falling edge is accordingly significantly greater than the absolute value of the gradient of the rising edge in this exemplary embodiment, with the ratio being approximately 3.45. In the period Z5, where the absolute values of the gradient are given as 0.0215 mm/mm for the falling edge and 0.007 mm/mm for the rising edge, the ratio is approximately 3.07. Accordingly, all periods have an asymmetry, with the asymmetry not being the same for all periods but being subject to a strictly monotonic change, specifically a strictly monotonic decrease. As a result, a distribution of the diffraction intensity between the diffraction maxima which is advantageous for the multifocal IOL can be achieved, with the result that the polychromatic diffraction intensity for the first negative order of diffraction is greater than the zeroth and the first positive orders of diffraction, even if the material dispersion of the lens body 12 is also taken into account.

Figures 4A, 4B:
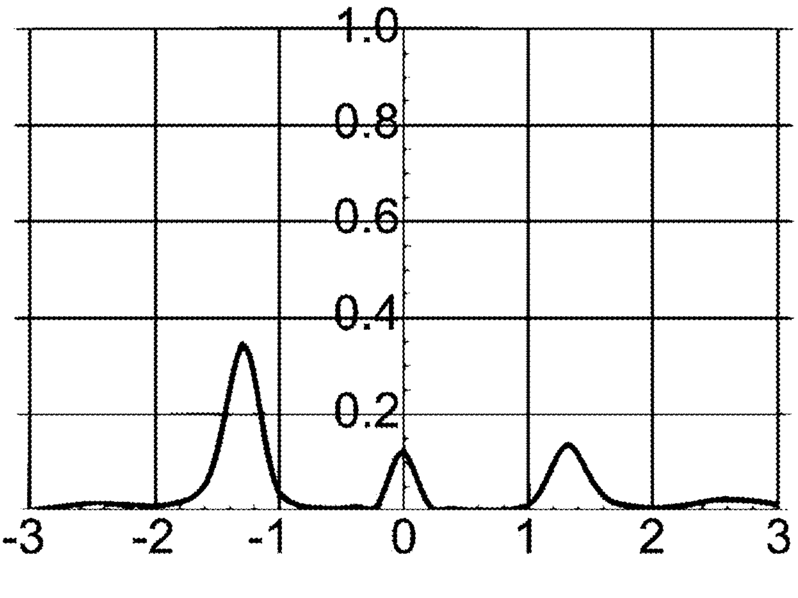
FIGS. 4A and 4B show the polychromatic diffraction efficiency of the lens according to the first exemplary embodiment.

The polychromatic diffraction efficiency for the lens 10 described in FIGS. 1A to 3C is shown in arbitrary units in FIGS. 4A and 4B, with FIG. 4A illustrating the polychromatic order of diffraction without taking into account the material dispersion of the lens body 12 and FIG. 4B illustrating the polychromatic order of diffraction taking into account the material dispersion of the lens body 12. The latter is decisive for the optical performance of the lens. The horizontal axis specifies the added diffractive power (add power) in dioptres, by which the refractive effect of the lens body is modified by the diffractive effect. The zeroth order of diffraction, which reflects the unmodified refractive effect of the lens body, accordingly has an added diffractive power of zero dioptres. The positive orders of diffraction have a positive added diffractive power since they bend the incident light toward the optical axis of the lens 10 and correspondingly amplify the refractive effect of the (convex) lens body 12. By contrast, the negative orders of diffraction have a negative added diffractive power since they reduce the effective refractive effect of the lens 10 since the diffractive power counteracts the refractive effect of the lens body 12. Thus, the first negative order of diffraction has an added diffractive power of approx. −1.3 dioptres and the first positive order of diffraction has an added diffractive power of about 1.3 dioptres.

As shown in FIG. 4A, the diffractive structuring with the properties as explained with reference to the previous FIGS. leads to the polychromatic diffraction intensity of the first negative order of diffraction being significantly greater than the polychromatic diffraction intensity of the zeroth and first positive orders of diffraction.

However, since the dispersion is in the same direction as the material dispersion and amplifies the latter accordingly in the case of the negative orders of diffraction, the ratio of the diffraction intensities is less pronounced when the material dispersion is taken into account, as shown in FIG. 4B. Nevertheless, what can be achieved with the lens according to the explained exemplary embodiment is that the polychromatic diffraction intensity of the first negative order of diffraction is greater than the polychromatic diffraction intensity of each of the zeroth and the first positive orders of diffraction, even when the material dispersion is taken into account. Consequently, a lens according to the explained exemplary embodiment offers the advantage that the greatest polychromatic diffraction intensity can be achieved in the first negative order of diffraction in particular, which is to say in that order of diffraction which is typically used for distance focus. This offers the advantage that the patient's visual experience can be significantly improved in comparison with lenses with a sinusoidal diffractive structuring. This also offers the advantage that this creates a continuous transition area between the distance focus (first negative order of diffraction) and the intermediate focus (zeroth order of diffraction), which has a positive effect on the depth of focus and improves the lens even further.

Figures 5A, 5B, 5C, 5D:
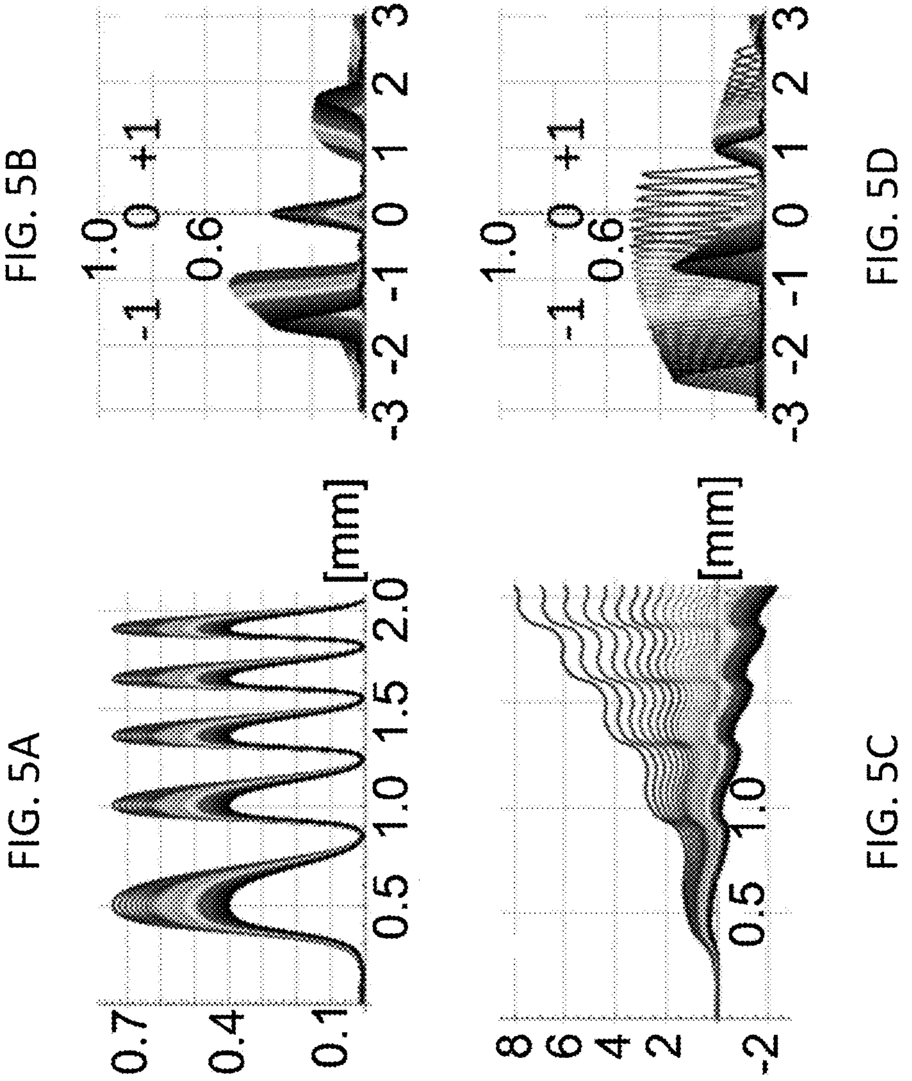
FIGS. 5A and 5B show the phase profile and monochromatic diffraction intensity as a function of the added diffractive power.

In order to characterize the optical performance of the lens 10, it seems necessary to consider the polychromatic diffraction intensity taking into account the material dispersion of the lens body 10, since the dispersion can have a significant influence on the optical power. This is illustrated in FIGS. 5A to 5D. FIGS. 5A and 5B show, respectively, the phase profile (as a function of linear radius) and monochromatic diffraction intensity as a function of added diffractive power (in dioptres), in each case without taking the material dispersion into account. FIGS. 5C and 5D show, respectively, the phase profile (as a function of linear radius) and monochromatic diffraction intensity as a function of added diffractive power (in dioptres), in each case with the material dispersion being taken into account. From this, it is evident that, for an optimization of the optical performance of a lens 10, the material dispersion of the lens body must also be taken into account in order to achieve the best possible result.

Figures 6A, 6B, 6C:
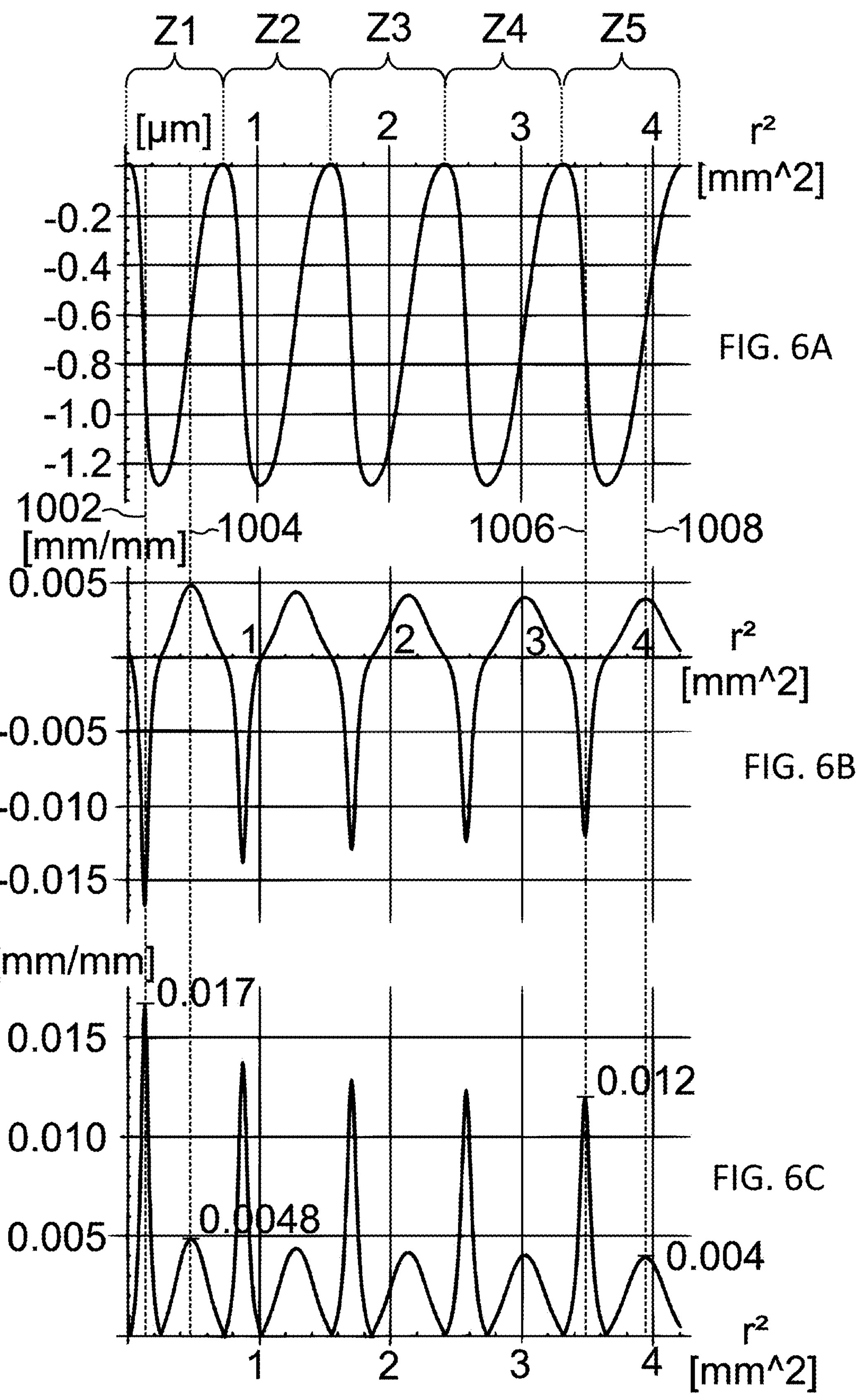
FIGS. 6A to 6C show the curve of a further diffractive structuring, the first derivative, and the absolute value of the derivative for a lens with a refractive index of $n_{IOL}=1.56$.

FIGS. 6A to 6C show the curve of a further diffractive structuring, the first derivative, and the absolute value of the derivative for a lens 10 with a refractive index of $n_{IOL}$=1.56. The refractive index of the surrounding medium in the eye is unchanged, $n_{MED}$=1.336. The illustration corresponds to that from FIGS. 3A to 3C, but in a configuration for a lens with a different refractive index. With regard to the explanations of the information presented, reference is therefore made to the explanations of FIGS. 3A to 3C. It is evident from the graphs that the ratio of the absolute values of the falling edges relative to the absolute values of the rising edges is 3.54 and 3.0 for periods Z1 and Z5, respectively. Accordingly, variations in the asymmetry may be advantageous for the adaptation to the respective refractive index.

Figures 7A, 7B:
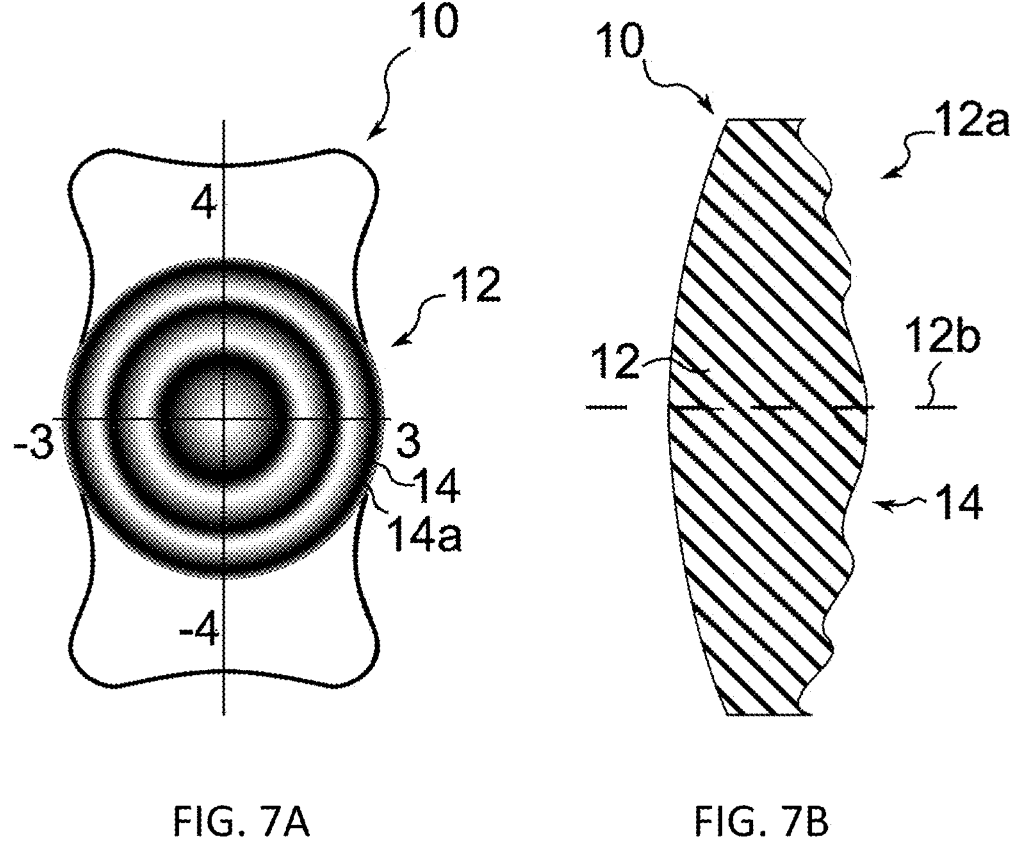
FIGS. 7A and 7B show an ophthalmic lens according to a further exemplary embodiment.

FIGS. 7A and 7B show an ophthalmic lens 10 according to a further exemplary embodiment of the disclosure, the lens 10 being designed as a monofocal intraocular lens (IOL) with an extended depth of focus. Such a lens is also referred to as an EDoF lens (EDoF=enhanced depth of focus). Like in the case of the IOL according to the exemplary embodiment explained above (FIGS. 1A and 1B) as well, this lens 10 also comprises a lens body 12 with a refractive effect, and a ring-shaped, diffractive structuring 14 which is attached to the front side 12*a* of the lens body 12 and has a plurality of rings 14*a* running concentrically around the optical axis of the lens 10. Like in FIGS. 1A and 1B as well, the illustrations shown here are also of a purely schematic nature and, in particular, the dimensions of the diffractive structuring are shown in greatly exaggerated fashion relative to the lens body.

According to this second exemplary embodiment, the diffractive structuring 14 is optimized with regard to its periodicity, the change in periodicity, the asymmetry, and the flattening, in such a way that the optical properties of the diffractive structuring 14 increase the depth of focus achievable with the lens 10 in comparison with a lens with regular, ring-shaped, diffractive structuring with a sinusoidal curve.

Figure 8A:
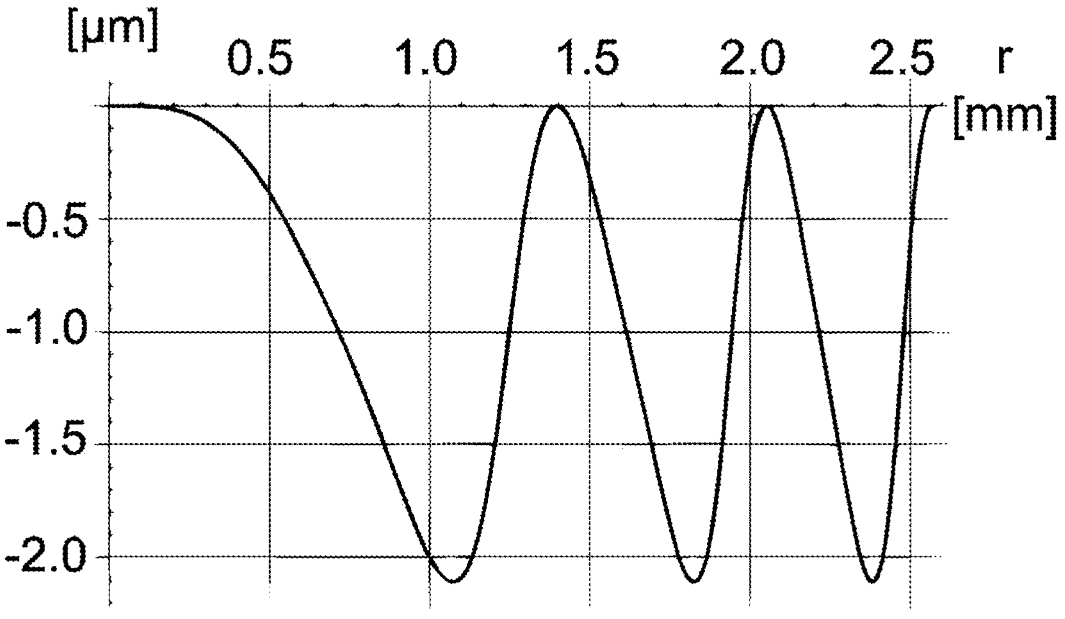
FIGS. 8A and 8B show the curve and the height profile of the wave-shaped diffractive structuring according to the second exemplary embodiment.
Figure 8B:
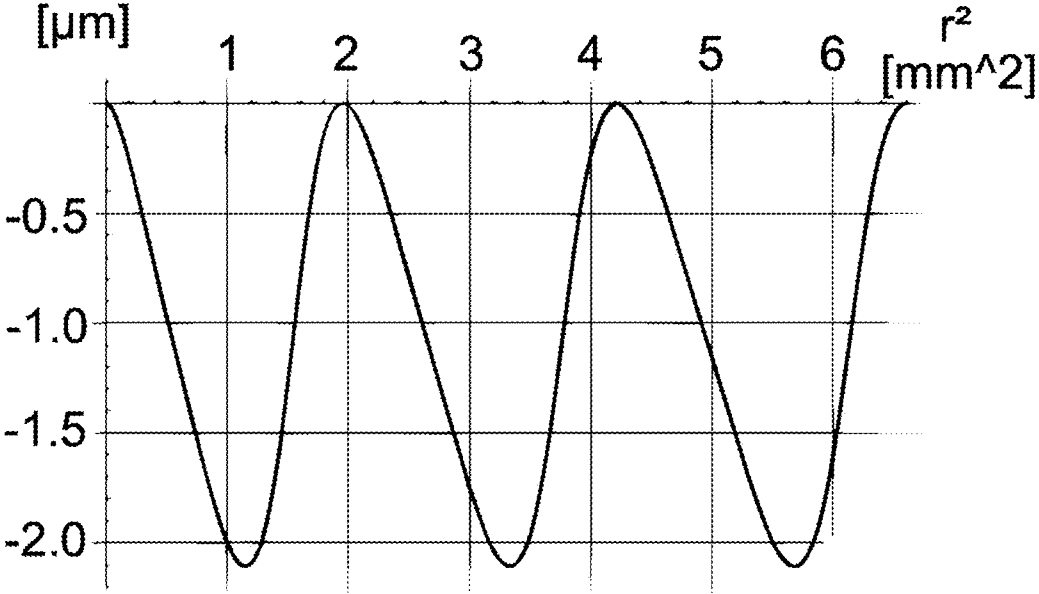

In FIGS. 8A and 8B, the curve or the height profile of the wave-shaped diffractive structuring 14 is plotted (in micrometers) relative to the curve of the otherwise smooth surface 12*a* of the lens body 12, which represents a subtracted base line, starting radially from the optical axis 12*a* of the lens 10, with the linear radius r being plotted on the horizontal axis in FIG. 8A and the radius squared $r^2$ being plotted in FIG. 8B. It is evident here that the periodicity of the waveform of the diffractive structuring is subject to a strictly monotonic change, both in the plot against the linear radius r and in the plot against the radius squared $r^2$. As is evident from the graphs, the periodicity in the radial direction decreases with increasing radius, with the result that the waveform is increasingly compressed. This is a feature in which the shown lens 10 according to the second exemplary embodiment differs from the lens 10 according to the first exemplary embodiment. In this case, the strictly monotonic change in the periodicity offers the advantage that the depth of focus of the lens 10 can be increased.

Figures 9A, 9B, 9C:
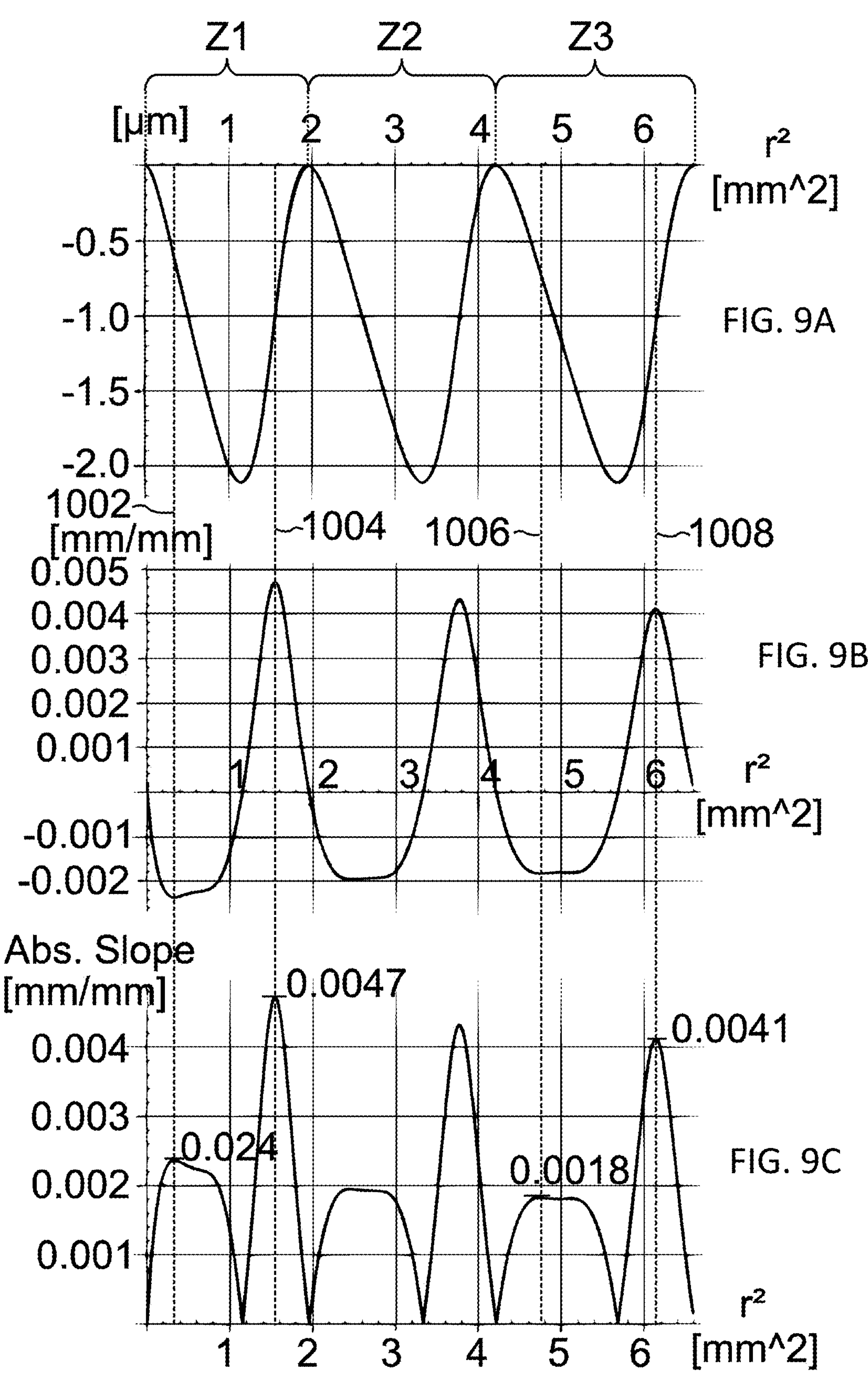
FIGS. 9A to 9C show further illustrations of the wave-shaped curve of the diffractive structuring.

A more detailed consideration of the asymmetry of the waveform of the radial curve of the diffractive structuring 14 is shown in FIGS. 9A to 9C, which, corresponding to FIGS. 3A to 3C, show the profile of the waveform against $r^2$ (FIG. 9A), the first derivative with respect to the radius in mm/mm (FIG. 9B), and the absolute value of the first derivative in mm/mm. In this case, the dashed vertical lines 1002 to 1008 indicate those locations at which the waveform has the locations that locally have the gradient with the greatest absolute value.

In this context, it is evident from the graphs that the rising edges, which is to say the sections that run towards a maximum, have a gradient with a greater absolute value than the falling edges, which run away from a maximum. In the first period Z1, a maximum gradient of the falling edge has an absolute value of 0.0024 mm/mm and a maximum gradient of the rising edge has an absolute value of 0.0047 mm/mm, and these maximum gradients therefore have a ratio of 1:1.96. In the period Z5, a maximum gradient of the falling edge has an absolute value of 0.0018 mm/mm and a maximum gradient of the rising edge has an absolute value of 0.0041 mm/mm, and these maximum gradients therefore have a ratio of 1:2.28. It is evident that the asymmetry or the ratio of the gradients within the respective period is also subject to a strictly monotonic change, which contributes to providing the increased depth of focus.

Figure 10A:
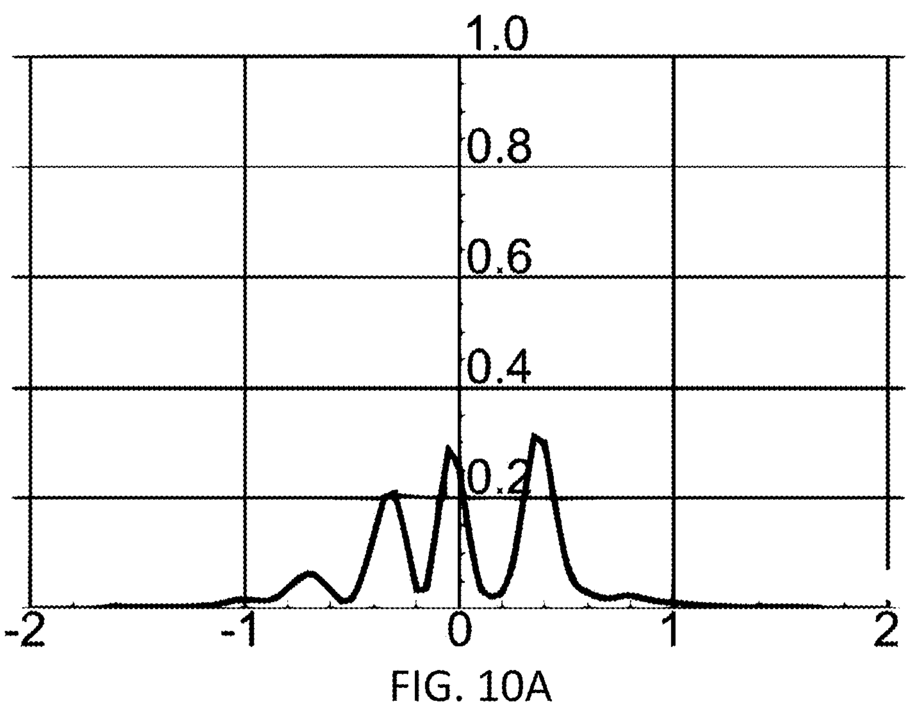
FIGS. 10A and 10B show the polychromatic diffraction efficiency of the lens according to the second exemplary embodiment.
Figure 10B:
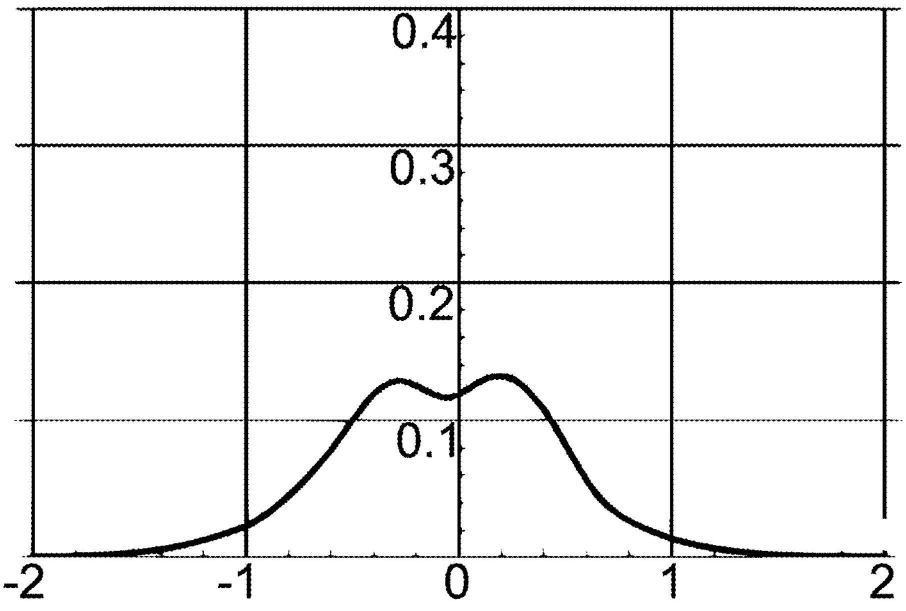

In FIGS. 10A and 10B, the polychromatic diffraction efficiency (in arbitrary units) resulting from the diffractive structuring 14 of the lens 10 according to the second exemplary embodiment is plotted against added diffraction power (in dioptres), without the material dispersion of the lens body being taking into account (FIG. 10A) and with the material dispersion of the lens body 12 being taking into account (FIG. 10B). In this case, it is evident from FIG. 10A that the diffraction intensity of the first positive order of diffraction is approximately 0.32, the diffraction intensity of the zeroth order of diffraction is approximately 0.3 and the diffraction intensity of the first negative order of diffraction is approximately 0.2. The individual orders of diffraction are clearly separated from one another when the material dispersion is not taken into account (FIG. 10A). A significant superposition of the orders of diffraction arises when the material dispersion of the lens body 12 is taken into account, with the result that an approximately 2 dioptre wide range of diffraction intensities arises around the zeroth order of diffraction, which provides the lens with a greatly increased depth of focus in comparison with a conventional monofocal lens.

Figures 11A, 11B, 11C, 11D:
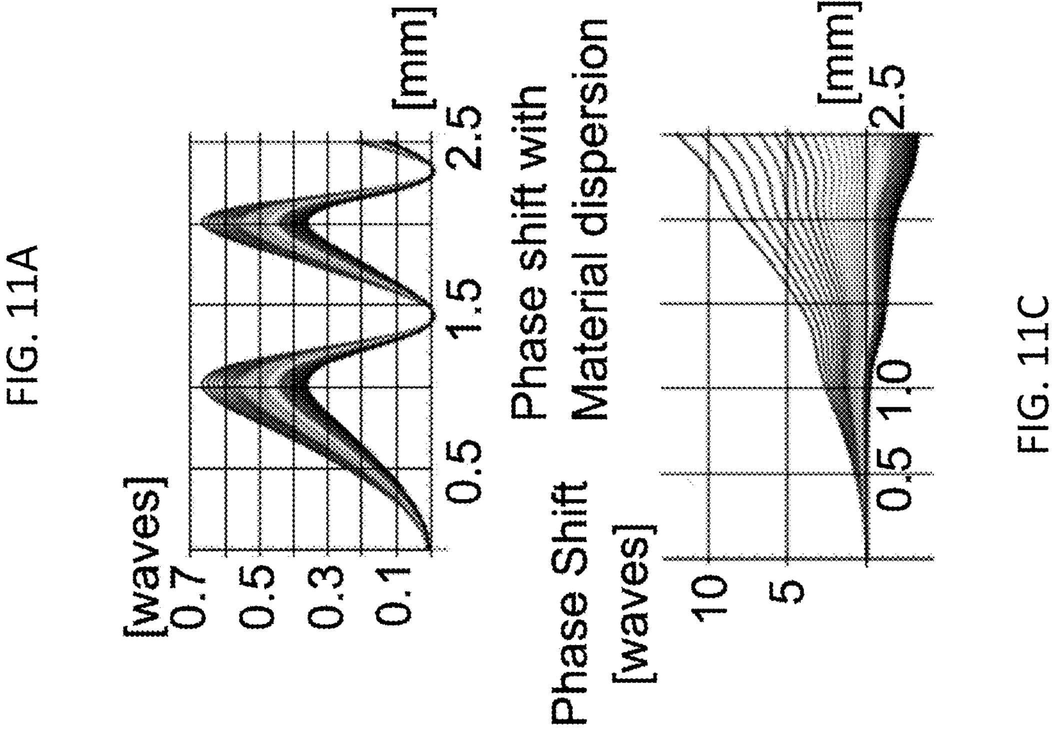
FIGS. 11A to 11D show the phase profile and monochromatic diffraction intensity.

FIGS. 11A and 11B show, respectively, the phase profile (as a function of linear radius) and monochromatic diffraction intensity as a function of added diffractive power in dioptres, in each case without taking the material dispersion into account, for the lens 10 according to the second exemplary embodiment. FIGS. 11C and 11D show, respectively, the phase profile (as a function of linear radius) and monochromatic diffraction intensity as a function of added diffractive power in dioptres, in each case with the material dispersion being taken into account. From this, it is evident that, for an optimization of the optical performance of a lens 10, the material dispersion of the lens body must also be taken into account in order to achieve the best possible result.

In the following, an example is used to explain how the mathematical description of an asymmetric waveform for the radial curve of a ring-shaped, diffractive structure can take place, without however the disclosure being limited thereto.

According to the example explained below, a regularly symmetrical shape of a sinusoidal curve is altered toward an asymmetrically undulated structure. The asymmetry in the diffraction profile achievable in this way allows the asymmetry already explained above with regard to the diffraction efficiencies of the different orders of diffraction in relation to the zeroth order of diffraction to be achieved, whereby one or more degrees of freedom for the design of lenses are provided, for example for the design of distance-dominant intensity distributions for multifocal intraocular lenses.

For example, the deviation of the profile from a sinusoidal curve can be described using the following mathematical formula f:

$$f\,[r, \omega, a, c, sf, \beta, \delta 0, \text{sync}] = \tag{1}$$

i. $$\sqrt{\frac{1 + sf(r)^{sync}}{1 + sf(r)^2 \operatorname{Cos}(\delta 0 + 2\pi\,\omega\, r^{sync} + \beta(r) \operatorname{Cos}(\delta 0 + 2\pi\,\omega\, r^{sync}))^2}}$$

-continued $$a \operatorname{Cos}(\delta 0 + 2\pi\omega r^{sync} + \beta(r) \operatorname{Cos}(\delta 0 + 2\pi\omega r^{sync})) + c;$$

The parameters and variables are explained below:

r radial position on the lens surface

ω parameters for the diffractive spacing of the orders of diffraction a phase angle deviation in multiples of the design wavelength c phase offset sf(r) "shape factor" form (flattening)

β(r) asymmetry parameter

δ0 lateral phase shift sync parameters for varying the periodicity

The effects of the individual parameters and their respective variation on the profile of the wave curve are illustrated below in exemplary fashion. For the sake of completeness, it should be mentioned that the mathematical function given above is only an example and other mathematical functions, for instance modified functions, functions based on Fourier series, an at least piecewise definition via polynomials and/or splines, may also be suitable for specifying an asymmetric wave profile for the radial curve of the diffractive structure.

Figure 12A:
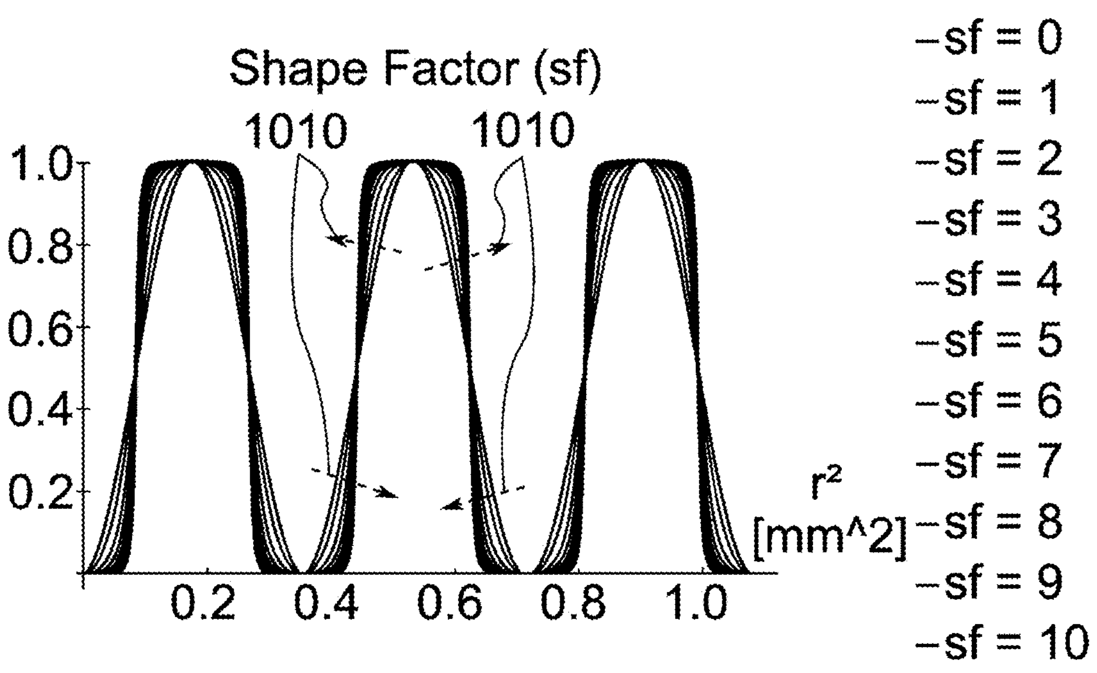
FIGS. 12A to 12D show the influence of various parameters on the curve of the waveform of the diffractive structuring.

The effect of varying shape factor sf(r), which influences the flattening of the wave profile, is shown in FIG. 12A. Here, an amplitude profile of the waveform (in arbitrary units) is plotted against the squared radius $r^2$ for different values of the shape factor sf(r). Even though the shape factor sf(r) may vary strictly monotonically with radius, the waveform for a radius-independent shape factor is shown in FIG. 12A for the sake of clarity. Here, the waveform according to equation (1) is plotted for different values of the shape factor sf, with the value range running from sf=0 to sf=10. The waveform experiences progressive flattening for increasing values of sf. The arrows 1010 elucidate the development of the flattening of the waveform with increasing sf, with the direction in which the respective arrows point indicating the direction of the development for increasing values of the shape factor sf. In this case, it is evident that for sf=0 the waveform has a strong resemblance to a sinusoidal waveform, whereas the waveform for sf=10 has been flattened into an almost rectangular waveform.

Figure 12B:
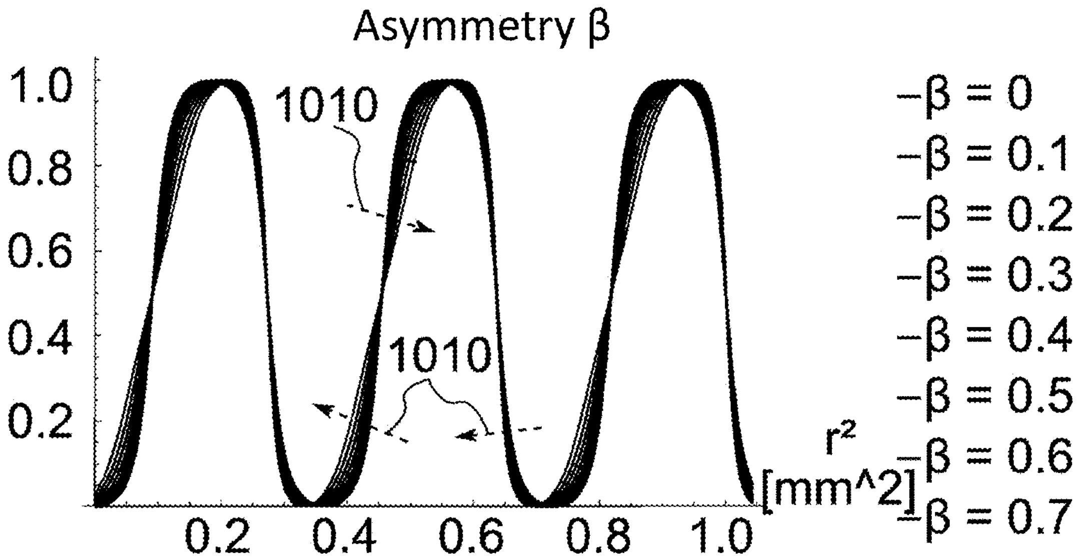

FIG. 12B shows an amplitude profile of the waveform (in arbitrary units) against the squared radius $r^2$ for different values of the asymmetry parameter β(r). Even though the asymmetry parameter β(r) may vary strictly monotonically with radius, the waveform for a radius-independent asymmetry parameter is shown in FIG. 12B for the sake of clarity. In this case, the value range runs from β=0 to β=0.7. In this case, increasing values of the asymmetry parameter βincreasingly influence the asymmetry of the waveform, with the result that the edges of the waveform increasingly deviate from a mirror symmetric curve with respect to the local maximum. For an increasing asymmetry parameter β, the edge running toward a local maximum loses steepness, while the edge running away from the local maximum increases in steepness. The development of the waveform asymmetry with increasing asymmetry parameter is indicated by the arrows 1010, with the arrows pointing in the direction of development for an increasing asymmetry parameter β.

Figure 12C:
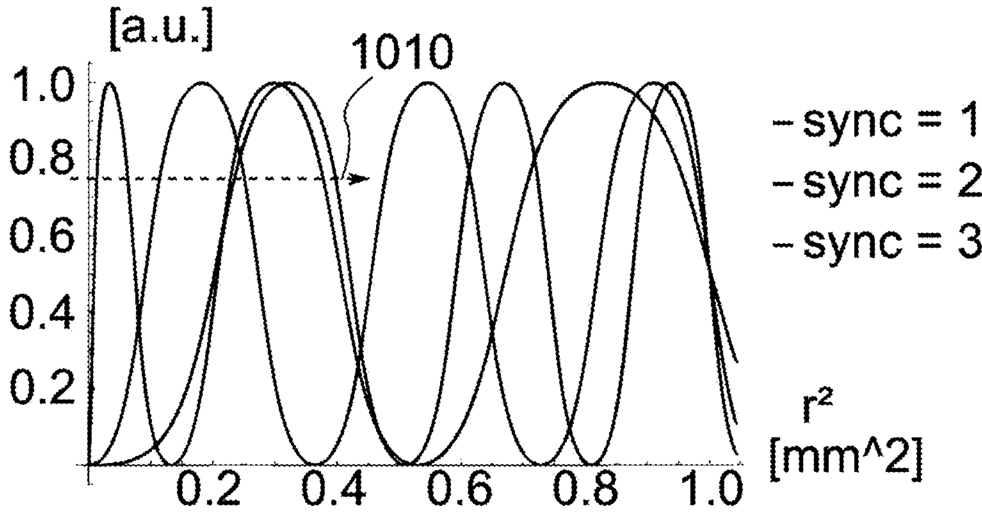

FIG. 12C shows an amplitude profile of the waveform (in arbitrary units) against the squared radius $r^2$ for different values of the sync parameter, which defines the periodicity. In this case, a value sync=1 means that the waveform is periodic with r, which is to say with the linear radius. If the sync parameter has a value of 2 or 3, the waveform is periodic with respect to $r^2$ and $r^3$, respectively. Naturally, values that differ from the values mentioned as examples are also possible for the sync parameter, in particular values that are not integers as well. As a result of the graph in FIG. 12C being plotted against the square of the radius, the waveform with synch=2 appears periodic. The waveform with sync=3 experiences a compression with increasing radius, while the waveform with sync=1 is stretched with increasing radius in the quadratic plot. Accordingly, FIG. 12C illustrates how the parameter sync can be used to obtain the periodicity of the waveform and, in particular, a strictly monotonic variation of the periodicity of the waveform. The arrow 1010 elucidates the increasing distortion of the waveform with increasing sync parameter.

Figure 12D:
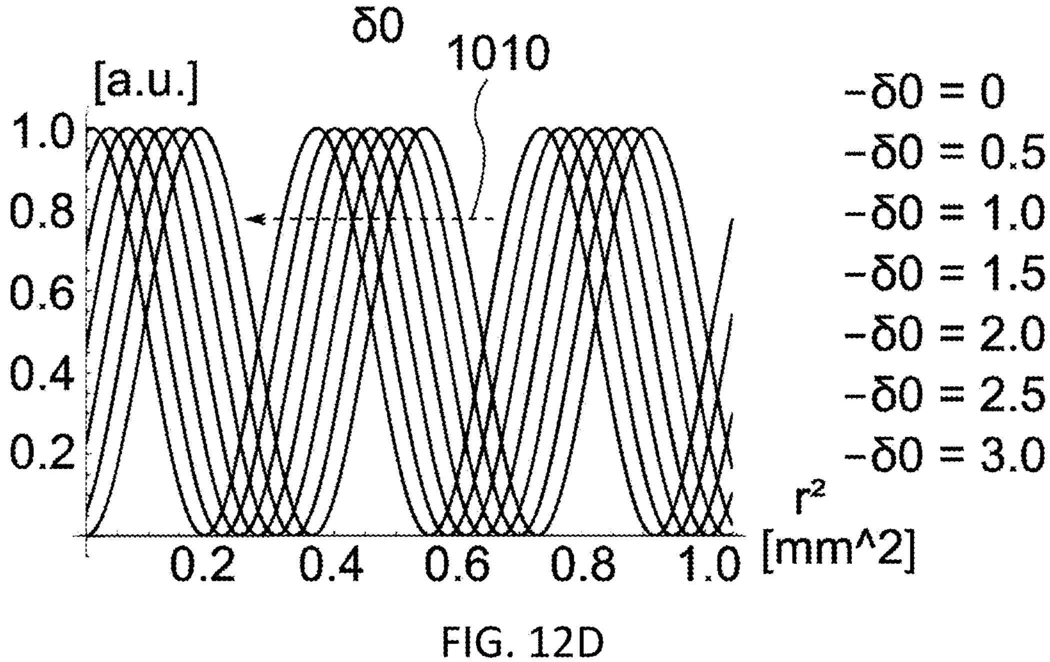

FIG. 12D shows an amplitude profile of the waveform (in arbitrary units) against the squared radius $r^2$ for different values of the 60 parameter, which specifies the lateral phase shift. A variation of this parameter correspondingly leads to a radial offset of the periodic waveform, without however affecting its wavelength, flattening, and asymmetry. In other words, a variation of the parameter 60 represents a shift in the waveform in the radial direction. The arrow 1010 indicates the increasing lateral shift of the waveform with increasing 60.

LIST OF REFERENCE SIGNS

10 (Ophthalmic) lens
12 Lens body
12*a* Front side or surface of the lens body
14 Diffractive structuring
14*a* Rings of diffractive structuring
1000 Period length
1002 . . . 1008 Locations with the maximum absolute value of the gradient
1010 Tendency of changes as each parameter increases
Z1 . . . Z5 Periods of the waveform

The invention claimed is:

1. An ophthalmic lens comprising:
a lens body with a predetermined refractive effect; and
a ring-shaped, diffractive structuring, wherein the ring-shaped, diffractive structuring has a waveform in a radial direction which differs from a sinusoidal waveform of a square of a radius by an asymmetry, which is constant or changes strictly monotonically over an entire radial curve of the waveform,
wherein the asymmetry is such that a maximum absolute value of the gradient of a falling edge is greater than the maximum absolute value of the gradient of a rising edge in respective periods of the waveform, and
wherein a ratio of the maximum absolute value of the gradient of the falling edge to the maximum absolute value of the gradient of the rising edge is at least 1.5.

2. The ophthalmic lens as claimed in claim 1, wherein the waveform is periodic over the square of the radius of the lens body in the radial direction.

3. The ophthalmic lens as claimed in claim 1, wherein an entire waveform of the ring-shaped, diffractive structuring has a continuously differentiable curve in the radial direction.

4. The ophthalmic lens as claimed in claim 1, wherein the asymmetry is such that the curve of the waveform in the radial direction is not mirror symmetric with respect to a local maximum of a respective asymmetric period.

5. The ophthalmic lens as claimed in claim 1, wherein the strictly monotonic change in the asymmetry is expressed as a strictly monotonic increase or a strictly monotonic decrease in the asymmetry.

6. The ophthalmic lens as claimed in claim 1, wherein the ring-shaped, diffractive structuring is arranged on a surface of the lens body.

7. The ophthalmic lens as claimed in claim 1, wherein the refractive effect of the lens body is at least partially spherical, aspheric, or toric.

8. The ophthalmic lens as claimed in claim 1, wherein the ring-shaped, diffractive structuring is formed concentrically about an optical axis of the ophthalmic lens.

9. The ophthalmic lens as claimed in claim 1, wherein the asymmetry is such that an average and/or the maximum absolute value of the gradient of the rising edge differs from the average or the maximum absolute value of the gradient of the falling edge in the respective periods of the waveform.

10. The ophthalmic lens as claimed in claim 1, wherein the ophthalmic lens is multifocal.

11. The ophthalmic lens as claimed in claim 1, wherein the ring-shaped, diffractive structuring is formed such that at least one negative order of diffraction of the ring-shaped, diffractive structuring has a greater polychromatic diffraction efficiency than a zeroth order of diffraction and/or a first positive order of diffraction.

12. An ophthalmic lens comprising:
a lens body with a predetermined refractive effect; and
a ring-shaped, diffractive structuring, wherein the ring-shaped, diffractive structuring has a waveform in a radial direction which differs from a sinusoidal waveform of a square of a radius by an asymmetry, which changes strictly monotonically over an entire radial curve of the waveform, and
wherein the asymmetry is such that a maximum absolute value of a gradient of a rising edge is greater than the maximum absolute value of the gradient of a falling edge in the respective periods.

13. The ophthalmic lens as claimed in claim 12, wherein a ratio of the maximum absolute value of the gradient of the rising edge to the maximum absolute value of the gradient of the falling edge is at least 1.5.

14. The ophthalmic lens as claimed in claim 12, wherein the ophthalmic lens is monofocal.

15. The ophthalmic lens as claimed in claim 12, wherein the ring-shaped, diffractive structuring is formed such that a polychromatic diffraction efficiency of at least one negative order of diffraction of the ring-shaped, diffractive structuring is at least 75% of a diffraction efficiency of a zeroth order of diffraction and/or a first positive order of diffraction.

16. The ophthalmic lens as claimed in claim 1, wherein the ophthalmic lens is an intraocular lens or a contact lens.

17. The ophthalmic lens as claimed in claim 1, wherein the strictly monotonic change in periodicity is expressed as a waveform period length which increases or decreases in the radial direction.

18. The ophthalmic lens as claimed in claim 10, wherein the ophthalmic lens is trifocal.

* * * * *